G. W. BARTLETT.
TIMBER MEASURING DEVICE.
APPLICATION FILED AUG. 7, 1913.
1,124,833.
Patented Jan. 12, 1915.
2 SHEETS—SHEET 2.
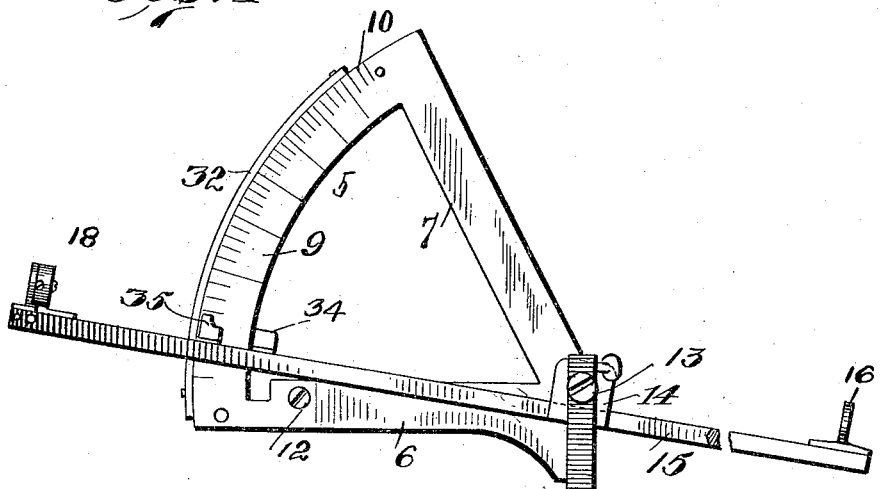
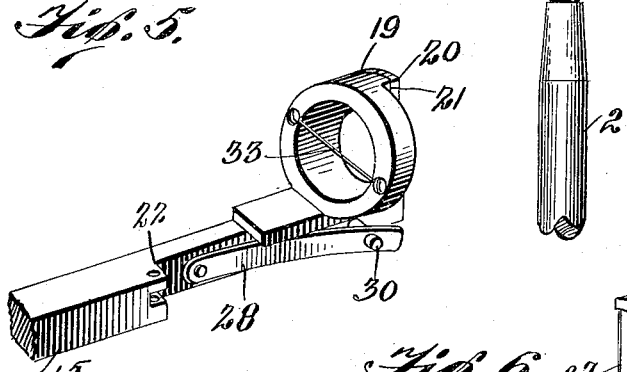
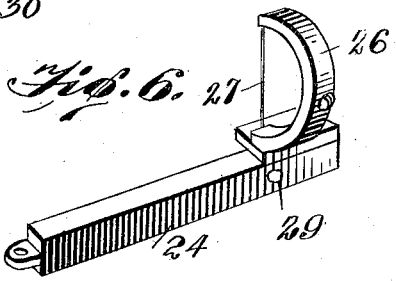
Inventor
GEORGE W. BARTLETT,
Witnesses
By William T. Jones,
Attorney

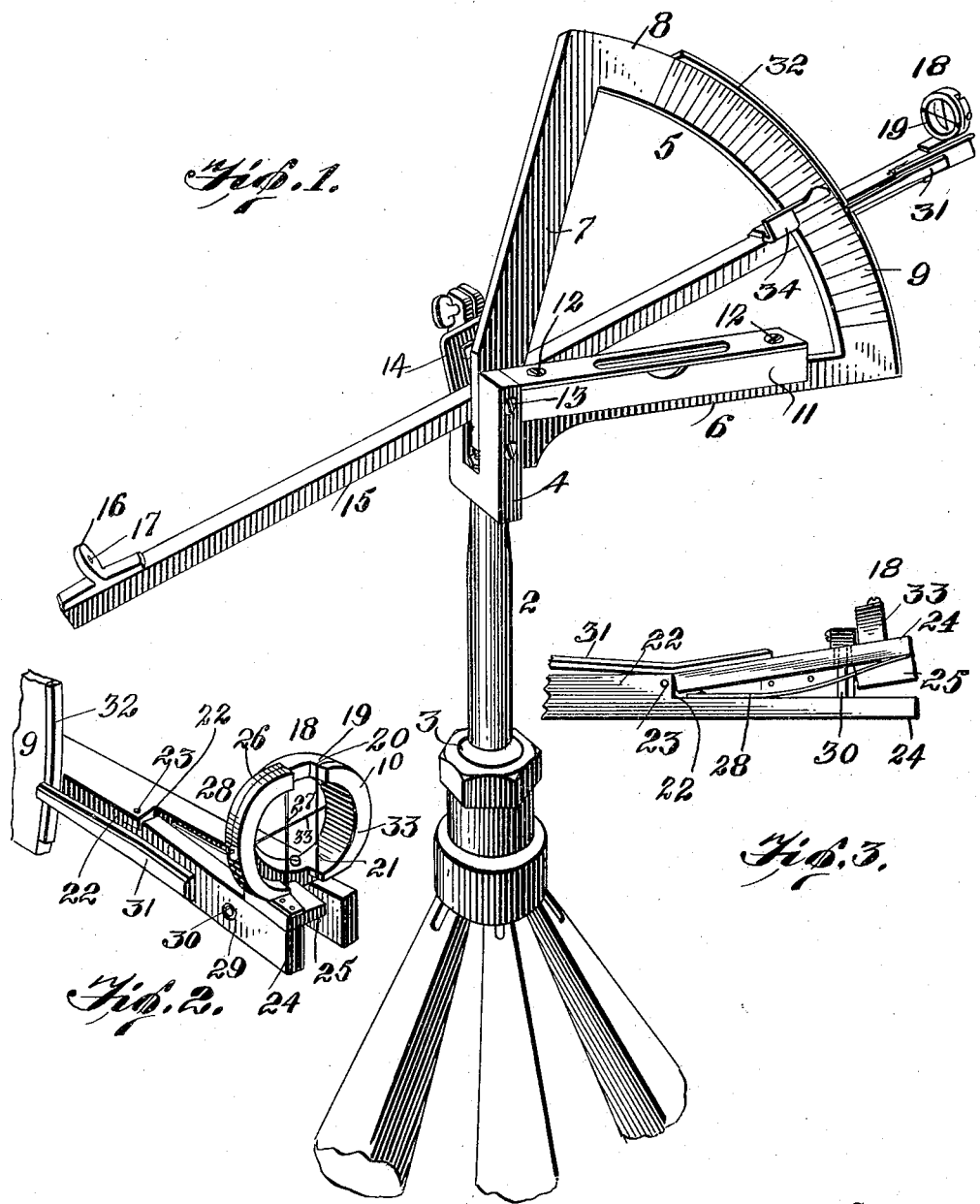

UNITED STATES PATENT OFFICE.

GEORGE W. BARTLETT, OF MEREDITH, NEW HAMPSHIRE.

TIMBER-MEASURING DEVICE.

1,124,833.      Specification of Letters Patent.      Patented Jan. 12, 1915.

Application filed August 7, 1913. Serial No. 783,634.

*To all whom it may concern:*

Be it known that I, GEORGE W. BARTLETT, a citizen of the United States, residing at Meredith, in the county of Belknap and State of New Hampshire, have invented certain new and useful Improvements in Timber-Measuring Devices, of which the following is a specification.

My invention relates to devices for measuring the amount of timber in a given tree.

It is well known in the lumber industry that only a certain portion of a tree is available for lumber, owing to the fact that the tree is attenuated from the bottom to the top, gradually tapering to a point where its timber is so small as to render this particular portion of the trunk useless for all practical purposes. This condition has led those engaged in the lumber industry to discard this useless extremity of the tree, and it is therefore an object of my invention to provide a device which will automatically measure the quantity of lumber contained in any desired tree at the point where its diameter is insufficient to permit of its being sawed or otherwise cut into boards or like parts. I attain this result by the use of the instrument which forms the subject-matter of the present application, and which generally speaking, comprises a rigid quadrant having a graduated arc and a cam or inclined lateral extension in combination with a pivoted rod or pointer. This pointer is provided with front and rear sights, one of which is equipped with a movable element for coöperation with the said lateral extension so that when the pointer bar is swung upon its pivot the sight will be caused to indicate the point at which the lumber is unavailable. The entire mechanism is suitably mounted upon a tripod or similar support to facilitate its transportation by a cruiser from place to place in the forest-lands. I also provide means for ascertaining the exact height of a tree, telegraph pole or the like, the same operating independently of the means employed for determining the height and diameter of the trunk.

To the accomplishment of the recited object and others subordinate therewith, the preferred embodiment of my invention resides in that construction and arrangement of parts hereinafter described, illustrated in the accompanying drawings, and embraced within the scope of the appended claims.

In said drawings: Figure 1 is a perspective view of the device embodying my invention. Fig. 2 is a detail perspective view of the forward extremity of the pointer bar, illustrating the construction and arrangement of the front side. Fig. 3 is a bottom plan view of the forward extremity of the pointer bar. Fig. 4 is a side elevation of the reverse side of the device. Fig. 5 is a detail perspective view of the forward extremity of the pointer bar showing the rigid portion of the side, and Fig. 6 is a similar view of the movable element of the side.

In the drawings, the numeral 1 designates a tripod having an upright 2 connected to its head by means of the ball and socket joint 3, the said upright terminating at its outer end in a U-shaped member 4 to which is rigidly secured the quadrant 5. This quadrant comprises a base 6, a leg 7 and an arcuate shaped portion 8 connecting the outer terminals of the base and the leg. For the purpose of clarity this arcuate shaped portion of the quadrant will be termed an arc, which it will be noted upon inspection of Figs. 1 and 4 of the drawings is suitably graduated upon opposite sides as at 9 and 10. The graduations 9 are preferably used for measuring the quantity of available timber in a given tree where the height of trees in a given forest varies from the minimum to the maximum, while the graduations 10 upon the opposite sides of the arc are employed for trees the height of which are below the maximum. To insure the location of the instrument in a true horizontal plane, I preferably use a conventional type of spirit-level 11, the same being secured to the base 6 of the quadrant by means of screws or equivalent fastening devices 12.

Pivoted to one of the arms of the support 4, as at 13 is the integral vertical flange 14 of a pointer bar 15 which extends upon both sides of the upright 2 and slidably engages one side of the arc 8. The rear end of this bar is provided with a sight piece 16 having a small opening 17 while the front end of the pointer carries a sight 18, which will now be described in detail. Rigidly secured to the forward end of the pointer is a ring 19 having an arcuate shaped laterally projecting flange 20 with a vertical wire 21 connecting its opposite ends. The forward extremity of the pointer is preferably rabbeted as shown in Figs. 2, 3 and 5, leaving a shoulder 22 to which is hinged, as at 23, a bar 24, carrying upon its outer end a small plate 25, which in turn supports an arcuate member 26 having a wire 27. This arcuate member 26 is a companion of the similarly shaped portion 20 carried by the rigid ring 19, and the function of the two devices will be presently described. The bar 24 is normally maintained separated from the rabbeted extremity of the pointer by means of a flat spring 28, and the said extremity carries a stud 30 engaging an opening 29 in the said bar for the purpose of preventing any relative displacement of these parts. Projecting rearwardly from the bar 24 is an arm 31, the outer free terminal of which engages the cam edge 32 of the arc 9. In addition to the foregoing I prefer to mount a cross or horizontal wire 33 upon the front side of the ring 19 to facilitate determining the entire altitude of a tree, and in order to assist in the various readings I mount the indexed pointers 34 and 35 for coöperation with the opposite graduations of the arc 9 and 10.

In use the cruiser selects any desired tree and measures say 50 feet, from the base thereof. With the aid of spirit-level 11 the instrument is adjusted in a true horizontal plane, and the pointer bar 15 is swung upwardly to approximate its final adjustment. Then upon looking through the small hole 17 in the rear sight piece 16 and manipulating the pointer until the vertical wires 21 and 27 are in focal alinement with the sides of the tree, the pointer bar, by reason of its frictional connection to the support 4 at 13, will remain in this position, and the measurement of the quantity of lumber may be ascertained with a nicety by referring to the index 34 and its corresponding registration with the graduations upon the arc of the quadrant. The fact that the quantity of lumber may be ascertained at the time when the vertical wires are in focal alinement with the sides of the tree is due to the engagement of the arm 31 with the cam projection 32, and in this connection it will be pointed out that the incline of the projection does not commence until it reaches a place say about one-third of the longitudinal extent of the arc 8, it being manifest that the perspective of a tree corresponding to the graduations, or at a point 20 or 25 feet high would appreciably affect the measurements. Upon the other hand, it will appear obvious that the altitude of the tree from 20 to 25 feet will materially alter the perspective, and for this reason there is a gradual increment of the inclination of the projection 32. It follows that upon estimating the amount of timber in a tree 75 feet high the vertical wires will be drawn rather closely together when the pointer bar has been adjusted so that the said wires are in focal alinement with the diameter of the tree. It will also be stated that the complete height of a tree or similar object may be readily and quickly ascertained by utilizing the rear side piece 16 in conjunction with the horizontal wire 33—this, of course, being an entirely separate and distinct operation.

With the use of my instrument the manner of determining the amounts of lumber in trees is considerably expedited, for as previously set forth only that amount of the tree which is actually good for timber is estimated upon, the remainder or the extremity having a dimension of five inches or less being discarded. By virtue of these inherent disadvantages a cruiser with this instrument at his disposal may ascertain the quantity of lumber in comparatively large forest-lands in a very short space of time—and do this work without the coöperation of any other cruisers or hands.

It should be understood that in its broader aspect the invention comprehends the employment not only of the various means described, but of equivalent means for performing the recited functions. While the arrangement shown is thought at the present time to be preferable, it is desired to reserve the right to effect such modifications and variations thereof as may come fairly within the scope of the appended claims.

What is claimed is:—

1. In a timber estimating device, the combination of a sector provided with graduations arranged to indicate timber contents, a pointer bar movable over said sector, and coöperating means on the pointer bar and sector adapted to indicate available timber contents of a tree.

2. In a timber estimating device, the combination of a sector, a pivoted pointer bar having front and rear sights a portion of said front sight being movable to indicate measurements conjunctively with said sector.

3. In a timber estimating device, the combination of a graduated sector, a pointer bar, said pointer bar having front and rear sights, a portion of one of said sights being movable, and means carried by the sector for varying the position of the movable portion of the sight commensurate with the adjustment of said pointer bar.

In testimony whereof I hereunto affix my signature in presence of two witnesses.

GEORGE W. BARTLETT.

Witnesses:
THOMAS L. WODLEIGH,
BERTRAM BLAISDELL.